Sept. 30, 1969 J. T. LENTZ 3,470,499

MATCHED SWITCH MATRIX

Filed Oct. 4, 1966

United States Patent Office 3,470,499

Patented Sept. 30, 1969

3,470,499

MATCHED SWITCH MATRIX

John Theodore Lentz, Harrisburg, Pa., assignor to AMP Incorporated, Harrisburg, Pa.

Filed Oct. 4, 1966, Ser. No. 584,238
Int. Cl. H01p 5/12
U.S. Cl. 333—7 2 Claims

ABSTRACT OF THE DISCLOSURE

A high frequency switch matrix for video and/or audio use is disclosed featuring a plurality of input paths and a plurality of output paths arranged in coordinate fashion. At each coordinate switch point a circuit is provided including a pair of contacts operable in open and closed positions to connect a given input to a given output path. Each switch point circuit further includes a capacitor effective when the contacts are open to compensate for stray capacitance and a pair of resistors and an inductor selected and arranged to balance out the capacitive reactance due to such capacitor.

BACKGROUND OF THE INVENTION

Ideally, a switch ought to connect a input signal to an output path without altering the signal to any extent. For example, in a simple DC application, the voltage and current of the signal output from a switch should be the same as the voltage and current input. In DC applications, a wide range of devices have been developed which come close to achieving the idea, since one need only obtain a contact resistance which is as low as possible. As signal frequency goes up the problem is expanded from one of simple resistance to one of impedance, including capacitive and inductuve reactance components. In applications wherein there is only a single switch with input and output paths of fixed impedance the problem is answered by providing paths matched to the input and output characteristics of the paths to be connected. When switches are placed in a matrix and physically joined in multiples to the same inputs and/or outputs and are placed in a package wherein inputs and outputs are physically close together, other problems are introduced. These have to do with the effect that one switch and one circuit path may have on an adjacent and interconnected switch and circuit path. One such effect, known as cross-talk, manifests itself by producing in a signal path which is supposedly open, signal components of an adjacent and closed signal path. Another problem is variation in frequency response which finds closures of different switches in a switching matrix operating to provide a different gain in different paths through the matrix. Still another problem is impedance matching, which finds the characteristic impedance "seen" by a line being altered, depending upon whether or not a given switch in the matrix is opened or closed.

These various effects, when present in a communication channel, cause loss or degradation of the transmitted signal. For example, in a system which is made to handle video signals, poor frequency response or mismatch will result in a picture which appears fuzzy or out of focus. With respect to audio signals, these effects will cause a voice to sound flat or garbled. With respect to transfer of coded business information, as in binary pulse form, these effects may cause the actual loss of bits of information or the injection of spurious bits of information.

SUMMARY OF THE INVENTION

This invention relates to a switch matrix of the type utilized to connect selected signal input paths to selected signal output paths and to a method of making such matrix.

The invention is particularly adaptable to switching applications for video and/or audio signals wherein switching effects are visually or audibly perceptible, although alternate uses are contemplated as in any switching application wherein signal loss or degradation may adversely affect intelligence transfer.

Accordingly, it is an object of the invention to provide a switch matrix which permits a selected connection of one of a number of inputs to a selected output signal path, with a minimum of signal distortion, loss or degradation.

It is a further object of the invention to provide a switch matrix having a circuit wherein undesirable switching effects are minimized witih respect to input and output signal paths.

It is a further object to provide a novel circuit for use in switching high frequency signals which minimizes the effects of stray capacitance on input signal paths associated with a switch.

It is yet another object of the invention to provide an economical and reliable switch point in conjunction with a switch matrix for high frequency switching applications.

The foregoing problems are overcome and the foregoing objectives are attained by providing a switch matrix composed of switch points which each include a fixed capacitance placed in shunt across switch point contacts and made effective to match stray capacitance found in a given switch design and a fixed inductance which, coupled with the fixed capacitance, operates to match the switch to the signal path input. The circuit operates so that when a switch is open the fixed capacitance is connected in series with a ground path. When the circuit of the switch is closed the input path "sees" a stray capacitance equal to the fixed capacitance to thus experience no change with respect to capacitance. The fixed inductance is placed across the switching path so as to be effective with respect to the fixed capacitance or the stray capacitance, when the switch is open or closed. Each switching point of a switching matrix is made to include the foregoing circuit features. The invention contemplates a technique for providing the parameters for capacitance and inductance in the circuit.

Figure 1:
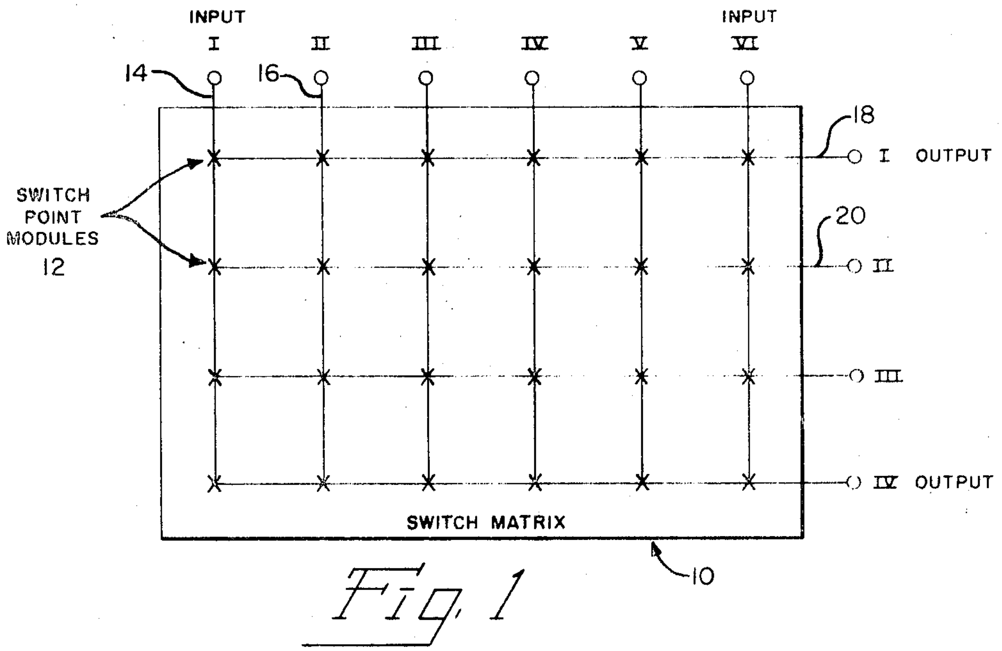
FIGURE 1 is a schematic view of a six-by-four switching matrix.

Referring to FIGURE 1, the switch matrix shown as 10 is adapted to connect any one of the six inputs numbered I–VI, to any one of the four outputs numbered I–IV. This is accomplished through twenty-four switch point modules 12, which are placed at the intersection of input paths, such as 14 and 16, and output paths such as 18 and 20. Each of these switch point modules is under the control of a separate control circuit which is capable of generating a signal to cause the switch point module to close or to open its contacts. Control for each switch point module may be carried out in a number of ways and reference is made to U.S. patent application Ser. No. 537,090, filed Mar. 24, 1966, for a signal switching circuit in the name of Edward Camp Dowling et al., for one preferred control circuit.

The switch matrix 10, including the various switch point modules 12, may be packaged together for ease of use, with the various switch point modules plugged into a chassis having portions thereon carrying coaxial connectors leading to the inputs and outputs and to the various switching paths. A preferred construction for a matrix like that of 10 is disclosed in U.S. patent application Ser. No. 537,527, filed Mar. 25, 1966, titled Switching Matrix, in the name of Raymond Melvin Carlisle et al., now U.S. Patent No. 3,331,991.

As heretofore discussed, the general objective of the matrix is to interconnect selected inputs to selected outputs, with as little electrical difference as possible between the paths seen by a given input and with each path having characteristics like that of the input path supplying the signals transferred. It is desirable that the VSWR of the line such as 14 be affected as little as possible by the closure of one of the switch modules connected to such line. It is important that the frequency response of the system including the input paths and the related equipment driving the matrix, as well as the output path and the equipment driven thereby, be affected as little as possible. It is also important that signal delay through the matrix be minimized. Thus, a signal transferred from input I out on output II should not be delayed or caused to change in phase with respect to an input on I to the output III or IV.

It has been suspected for some time that stray capacitance is a major contributor to poor operation in switch matrices and a number of attempts have been made to deal with the problem. One of the most frequently used approaches is to place a low output impedance (close to zero) amplifier in each input path so as to provide isolation between the various switching paths in the matrix. Another approach has been to construct an artificial delay line of fixed inductance having fixed point taps each with a capacitor which has a capacitive value calculated to be equal to stray capacitance. Of these approaches the former is quite expensive and makes the system dependent upon a number of additional components and circuits. The latter approach introduces a delay between different switching paths, and is therefore, objectionable, particularly as to use with color video signal transfer wherein slight delays can completely change the color of things presented in a video picture.

Figure 2:
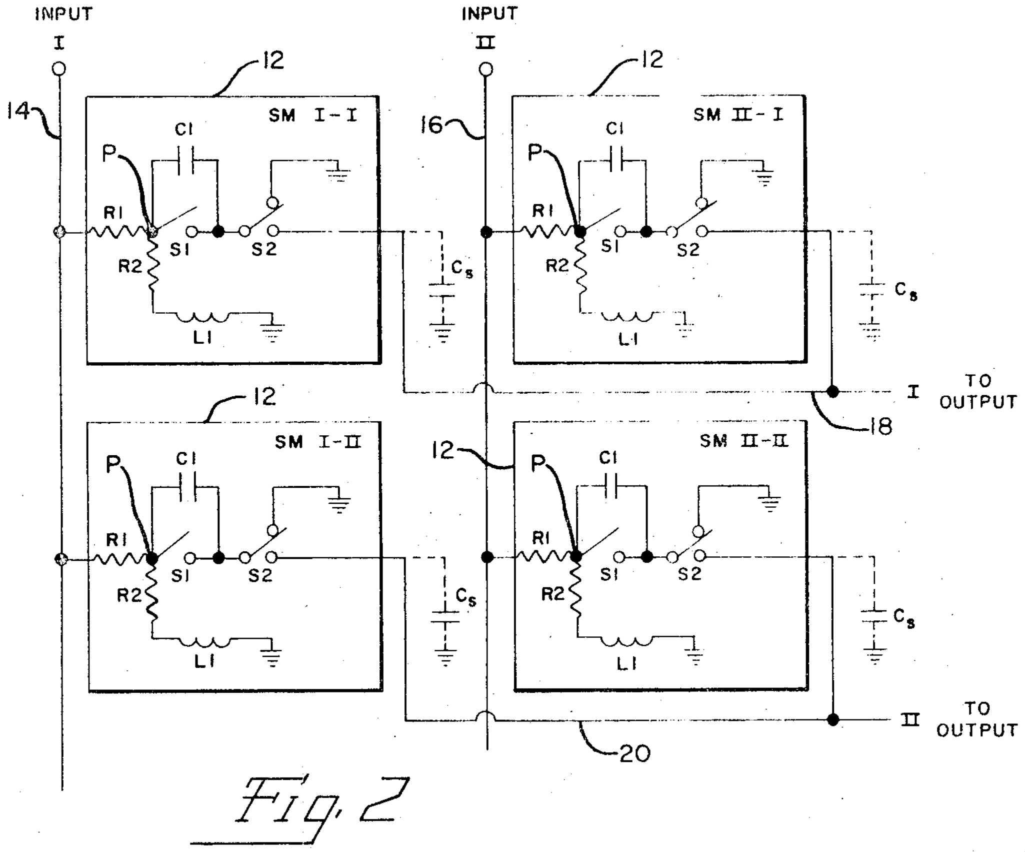
FIGURE 2 is a schematic wiring diagram of a portion of a switching matrix of FIGURE 1, showing in detail the circuit components arranged in a preferred manner.

FIGURE 2 shows a section of a switch matrix like that of 10 in FIGURE 1, including four switch points SMI–I, SMI—II, SMII–I and SMII–II, enlarged to include the circuit details of the invention. From FIGURE 2 it will be apparent that each switch module contains a number of components in a circuit connected to a pair of switch contacts shown as SI and SII. The contacts, when closed, connect a given input to a given output. The contacts SI and SII are opened and closed under the control of solenoid or relay windings, which are not shown in FIGURE 2, but which may be in the form described in the previously mentioned application S.N. 537,090. Associated with each input to output path there is some stray capacitance value which is (for illustration) broken down into the components $C_s$ for each module 12. Stray capacitance represents that quantity of capacitance caused by the physical packaging of the various conductive paths of the matrix. Stray capacitance exists between various input lines and ground and between various output lines and ground. The quantity $C_s$ can be approximately ascertained by calculation or preferably by actual measurement for a given packaging design. It has been discovered that $C_s$ varies from design to design and that for reasons not completely understood a matrix design of one size, as for example the six-by-four matrix shown in FIGURE 1, will have a $C_s$ which is not proportional to that of a larger but substantially identical design, as in a ten-by-twenty-four matrix.

In accordance with the invention, a switch matrix is first designed mechanically with all conductive paths being laid out and with all terminals, connectors, shields and the like being put together with an attempt being made to minimize $C_s$ and to make it as constant throughout the matrix as is possible. Then, measurements are made to ascertain the exact value of $C_s$ at various points throughout the matrix so as to determine the value thereof. Next, the circuit shown in FIGURE 2 as forming a switch module is put together with a fixed capacitor C1 placed across the contact terminals of SI. The capacitor C1 is chosen to be equal or approximately equal to the value of $C_s$. Next, a calculation is made to compensate for the capacitive reactance resulting from C1 or $C_s$ over the frequency range anticipated for a given source. An inductor L1 is chosen to provide the compensation for C1 or $C_s$ over the expected frequency range so as to obtain an impedance match to the line. The resistors R1 and R2 are chosen to balance resistive components seen by the input when the switch module is caused to be opened or closed through a given output. For example, in a system with ten output lines connected to a 75 ohm input liner, $R1+R2$ is made to be 750 ohms for each module so that the input will see a 75 ohm load.

In operation, assuming that a given switch module 12 is opened with the contacts SI and SII thereof in the position shown in FIGURE 2, an input path, such as 14, will see a series parallel path comprised of R1 in series with C1 and whatever resistance there is in the contact interface of SII to ground, in parallel with a path comprised of R2 and L1, to ground. With the switch contacts closed the input path will see a series parallel path comprised of R1 in series with the very slight resistance of contacts SI and SII, and $C_s$, to ground in parallel with a path including R2 and L1, to ground. Since C1 and $C_s$ are approximately the same the input will see the same impedance, whether the switch is opened or closed. For this reason and by judicious choice of other components in these paths the impedance of the switch module may be matched to that of an input line to thus hold the VSWR seen by an input constant whether a switch point module is open or closed. It has also been found that the invention circuit improves frequency response of the matrix system. It is known that a poor match contributes to a lack of flatness in frequency response, but it is believed that there is an additional contributing factor related to the presence of stray capacitance, which is also cured by the circuit apart from merely obtaining a match in impedance for open and closed conditions.

It will be observed from FIGURE 2 that as between switch point modules there is an identical circuit containing a substantially identical inductance and therefore providing an identical response with respect to delays introduced into the line. It will be observed that the fixed inductor L1 is in shunt to ground with respect to the line at all times, including when the switches are closed.

In an actual circuit utilizing the above described invention, the components identified in FIGURE 2 had the following values:

R1=619Ω
R2=130Ω
C1=150 $\mu\mu$f. (for a twenty-four-by-ten matrix having a lumped stray capacitance approximately 150 $\mu\mu$f.)
L1=1$\mu$h.

Having now disclosed the invention in terms intended to enable its preferred practice, I define it through the appended claims.

What is claimed is:

1. In a switch matrix of the type adapted to be used with high frequency signal applications a plurality of input paths and a plurality of output paths, a plurality of switch point circuits connected in multiple to given input paths and given output paths to form a matrix of circuits, each circuit including a pair of contacts adapted to be driven open or closed simultaneously to connect or disconnect a given input to a given output path, each circuit further including a resistance network having a resistor connected in series with a given input to output path through the circuit and a resistor connected in shunt therewith relative to ground, said resistors having values related to a load connected to said output path to hold the resistance seen by an input path constant whether said switch contacts are open or closed, a capacitor connected across one of said contacts, the other of said contacts having a connection to ground when in its open position, said capacitor being substantially equal to the stray capacitance existing between the output side of a switch circuit and ground, an inductor in series with said shunt resistor of a value to compensate for said capacitor with respect to the impedance of said input path, said matrix operating to hold the impedance seen by an input path substantially constant whether said switch point contacts are open or closed.

2. In a switch point module adapted for use in a switch matrix having a series of input and output conductive paths and having a given stray capacitance between a given output path and ground, a circuit comprising an input adapted to be connected to a switch matrix input and an output adapted to be connected to a switch matrix output, switch contacts adapted to be driven to be open or closed to define first and second circuit paths, respectively, said first path being effective in a circuit when said contacts are opened and said second path being effective when said switch contacts are closed, the said first path including a connection from said input path through a fixed resistor and a capacitor approximately equal in capacitance to said stray capacitance and one switch contact to ground and in parallel therewith a connection through said fixed resistor and a further resistor and an inductor to ground, the said second path including a connection through said fixed resistor, through both said switch contacts to an output path and to a load having an input resistance sufficiently greater than that of said fixed resistor in parallel with said second resistor and said inductor with respect to ground so that the impedance of said paths is constant whether said switch contacts are open or closed.

References Cited

UNITED STATES PATENTS

| | | | |
|---|---|---|---|
| 2,664,546 | 12/1953 | Goodale | 333—8 |
| 3,087,125 | 4/1963 | Scholefield | 333—7 |
| 3,250,860 | 5/1966 | Vincent et al. | 333—12 XR |
| 3,360,747 | 12/1967 | Lancaster | 333—97 XR |

HERMAN K. SAALBACH, Primary Examiner

M. NUSSBAUM, Assistant Examiner

U.S. Cl. X.R.

333—8